(No Model.)

A. S. GOODRICH.
NUT LOCK.

No. 329,547. Patented Nov. 3, 1885.

Witnesses:
D. C. Hills
W. B. Masson

Inventor:
Andrew S. Goodrich,
by E. E. Masson
atty.

UNITED STATES PATENT OFFICE.

ANDREW S. GOODRICH, OF CLIFTON, ASSIGNOR TO HIMSELF AND OSCAR F. SHAW, OF BROOKLYN, NEW YORK.

NUT-LOCK.

SPECIFICATION forming part of Letters Patent No. 329,547, dated November 3, 1885.

Application filed November 8, 1884. Serial No. 147,387. (No model.)

*To all whom it may concern:*

Be it known that I, ANDREW S. GOODRICH, a citizen of the United States, residing at Clifton, town of Southfield, in the county of Richmond and State of New York, have invented certain new and useful Improvements in Nut-Locks, of which the following is a specification, reference being had therein to the accompanying drawings.

This invention relates to that class of nut-locks that are provided with a key made to engage with the thread of the bolt; and it consists in certain improvements in the construction of the same, which will be hereinafter fully described, and particularly pointed out in the claims.

Figure 1:
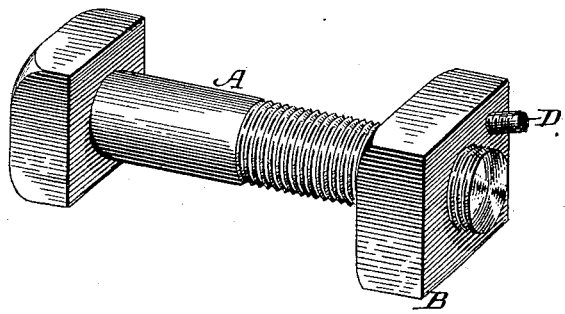
Figure 2:
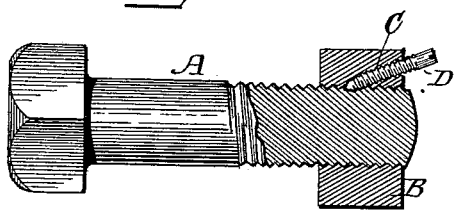
Figure 3:
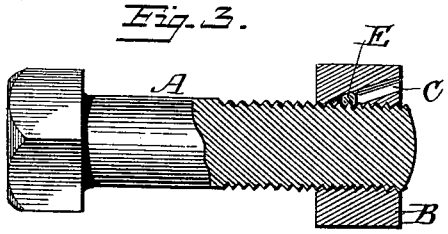

In the accompanying drawings, Figure 1 is a perspective of an ordinary bolt and nut provided with my improvement. Fig. 2 is a side view of the same with the nut and a portion of the bolt in section. Fig. 3 is a similar figure showing a modification of my invention.

Similar letters refer to similar parts throughout the several views.

A represents an ordinary screw-bolt, and B the nut thereof to retain the latter in position upon the bolt, so that it cannot be accidentally unscrewed by the jarring of machinery or the passing of railroad-trains when used upon fish-plates and in other locations. A hole, C, is bored into the outer face thereof obliquely, but nearly parallel to the side of bolt A, and toward the center thereof, and said hole is preferably screw-tapped.

D represents a screw, of any suitable metal, which is made to fit in the screw-hole C. This small screw D, entering the face of the nut B at an acute angle thereto, soon comes in contact with the threads on the bolt A, and, more or less indenting them, holds the nut B immovable thereon. Any tendency of the nut B to become loose or unscrewed simply wedges the sides of the small screw D against the threads of the large bolt A, and causes it to hold the parts together. The slotted end or head of the screw D may be retained to loosen it and allow the nut to be tightened or loosened when desired; or said head may be cut off after the nut is once set to prevent any tampering with said nut.

In place of the screw D, an ordinary pointed pin may be driven from the face of the nut into the hole C and obliquely against or into the threads of the bolt.

E represents a small plug, of lead or any suitable soft and easily-compressed material, of somewhat smaller diameter than the hole C, but of a suitable length. This piece of lead is first inserted in the opening or screw-hole C, and then the screw D pointed at the end, and when the latter is forced against the lead this soft plug fills any space that may be between the screw-threaded hole C and the thread of the bolt A, and retains the nut firmly upon said bolt.

I am aware that screws or pins have been used to hold nuts in position upon bolts; but so far as I am aware they have been inserted either in the end of the bolt or on the side of the nut nearly parallel with its face, and were easily loosened by jarring them; but with a pin or a screw inserted obliquely into the face of the nut the screw D acts as an acute wedge as well as a key, and produces a simple and reliable fastening for the nut.

Having now fully described my invention, what I claim is—

1. In combination with a nut and bolt, a pin or screw inserted into the nut obliquely through the face of said nut adjoining and nearly parallel with the side of the bolt, substantially as and for the purpose described.

2. The combination of a bolt, a nut having its outer face provided with a perforation, C, made obliquely therein adjoining its bolt receiving central opening, and a soft-metal plug inserted within the oblique perforation C, with a pin or screw, substantially as and for the purpose described.

In testimony whereof I affix my signature in presence of two witnesses.

ANDREW S. GOODRICH.

Witnesses:
O. F. SHAW,
E. J. MEYERS.